Aug. 13, 1940.  J. L. ANDERSON  2,211,224
CUTTING APPARATUS
Filed April 11, 1939  2 Sheets-Sheet 1
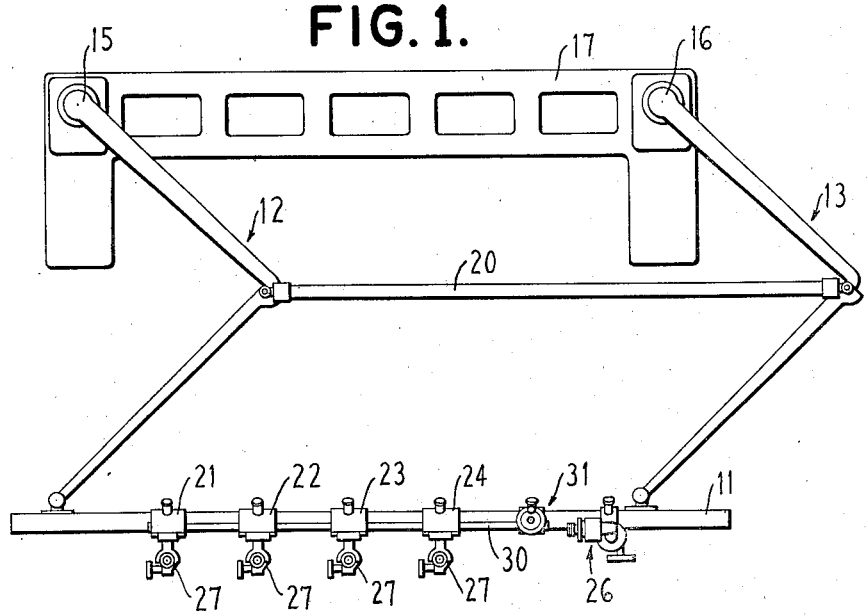
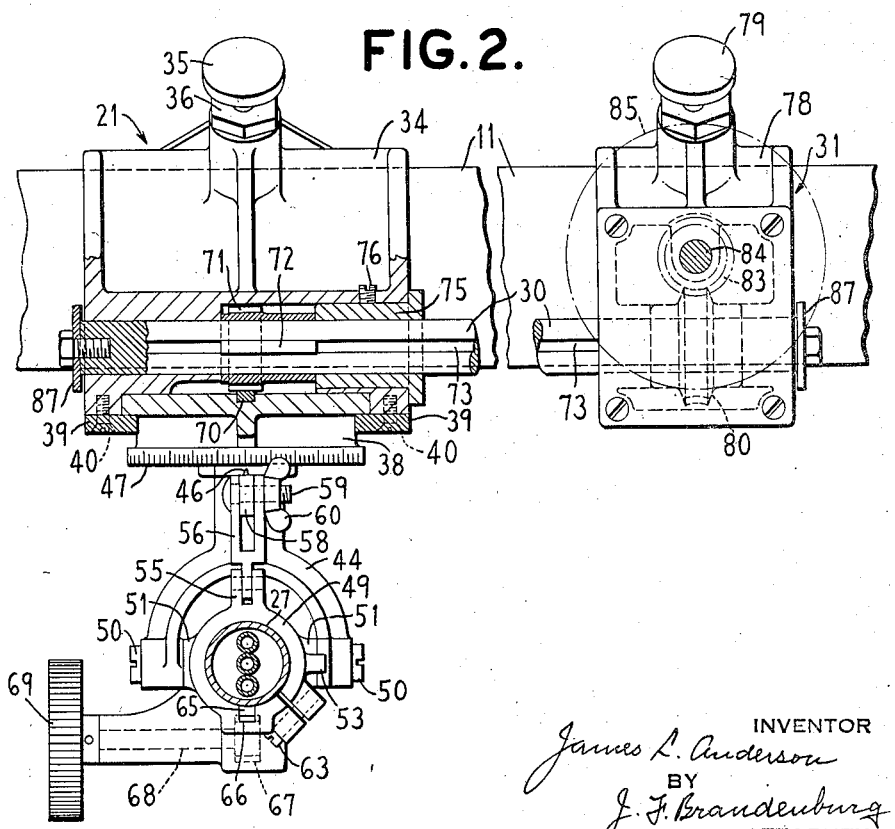
INVENTOR
James L. Anderson
BY
J. F. Brandenburg
ATTORNEY

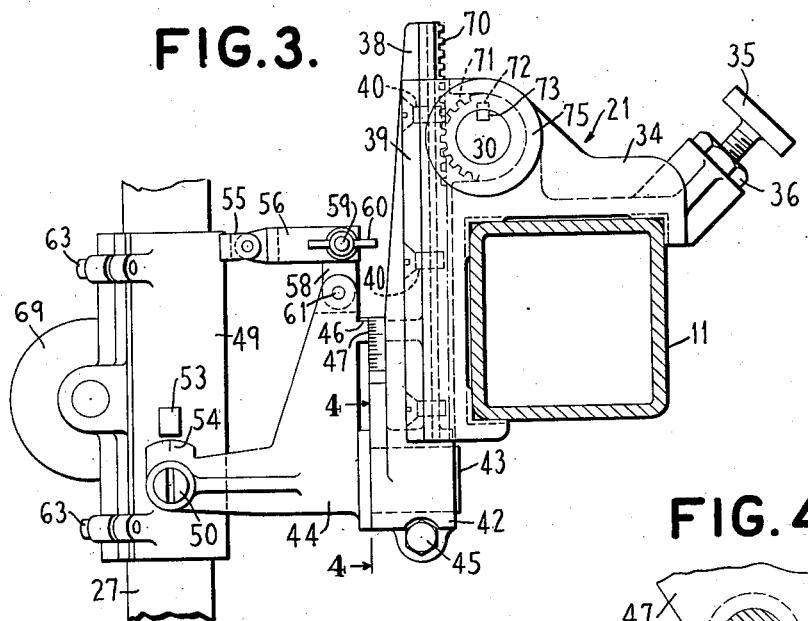
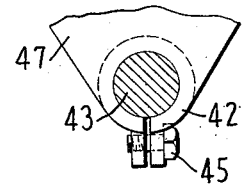
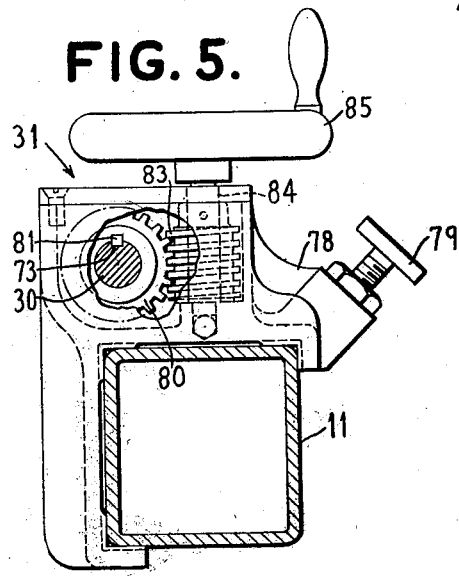

Patented Aug. 13, 1940

2,211,224

UNITED STATES PATENT OFFICE 2,211,224

CUTTING APPARATUS

James L. Anderson, Closter, N. J., assignor to Air Reduction Company, Incorporated, New York, N. Y., a corporation of New York Application April 11, 1939, Serial No. 267,301

13 Claims. (Cl. 266—23)

This invention relates to metal cutting apparatus, and especially to apparatus for making a number of similar cuts at the same time with oxygen cutting torches.

One of the useful applications of oxygen cutting has been the simultaneous production of duplicate pieces by guiding a number of cutting torches from a single tracing device or template-follower. In a universal cutting machine that has a folding parallelogram frame with a supporting bar that moves parallel to itself in any and changing directions in a plane, a tracer is attached at one place on the bar, and a number of torches are attached to the bar at spaced regions along the length of the bar. The distance between torches depends upon the size of the pieces to be cut, and the torch-holders can be shifted on the bar to change their spacing.

It is an object of this invention to provide improved apparatus for simultaneously adjusting a number of torches from a single adjusting device which is preferably manually operated, but may be power operated. One feature of the invention is the adjustment of the torches from a device which is located at a fixed point and unaffected by changes in the spacing of the torches from the fixed point or from each other.

While intended primarily for universal cutting machines, the invention is not limited to such machines, and some features of the invention are not limited to multiple cutting. For example, the adjustment of a torch, which can be shifted into different positions, from a control device that remains in a fixed location, is a feature than can be incorporated in a single-torch machine. The invention includes also a novel torch-holder construction.

In its broader aspects, therefore, it may be said that it is an object of the invention to provide improved apparatus for holding a torch and for adjusting a torch toward and from a work-piece.

Other objects, features and advantages of the invention will appear or be pointed out as the specification proceeds.

In the accompanying drawings, forming part hereof:

Fig. 1 is a top plan view of a universal cutting machine embodying this invention.

Fig. 2 is an enlarged view, partly in section, of one of the torch-holders and the remote adjusting mechanism of Fig. 5.

Fig. 3 is a side view of one of the torch-holders shown in Fig. 2.

Fig. 4 is a sectional view taken on the line 4—4 of Fig. 3.

Fig. 5 is a side view, partly broken away, of the adjusting mechanism shown in Fig. 2.

The cutting machine shown in Fig. 1 includes a folding parallelogram frame having a bar 11 supported at the front end of jointed arms 12 and 13. These jointed arms are connected by pivots 15 and 16 to the stationary frame 17 of the cutting machine. A cross link 20 between the arms 12 and 13 forms with the bar 11 and the forward links of the arm the folding parallelogram of the supporting frame. The front bar 11 has universal movement in the plane of the paper, and it always moves parallel to itself so that all points on the bar 11 follow similar paths of movement.

There are four torch-holders 21—24 clamped to the bar 11 at equally spaced points along the bar. A tracer 26 is clamped to the bar 11, near one end, and any path that this tracer follows on a pattern is reproduced by a torch 27 in each of the torch-holders 21—24. In this way four pieces, identical with the pattern, can be cut from a plate in one operation.

At the start of the cut each torch has to be moved into cutting relation to the work, and at the end of the cut the torches have to be lifted away from the work. There is mechanism in each torch-holder for raising and lowering the torch with respect to the work-piece, and this raising and lowering mechanism of all of the torch-holders can be operated by the rotation of a rod 30 that extends parallel to the front bar 11. The rod 30 is rotated by an adjusting device 31.

The adjusting device 31 is preferably clamped to the bar 11 and can be located at various points along the bar, but when this device has been clamped in position it ordinarily remains fixed and the torch-holders 24 can be shifted into any locations and set at any spacing within the limits of the length of the rod 30 which, in the illustrated embodiment of the invention, comprises the motion transmitting connection between the adjusting device 31 and each of the torch-holders 21—24. The spacing at which the torches must be set is determined by the greatest dimension, in a direction parallel to the bar 11, of the pieces to be cut. Torch spacing much in excess of that dimension leaves unnecessary waste. When pieces corresponding to a new pattern are to be cut, therefore, it is often advantageous to change the spacing of the torch-holders.

Figs. 2 and 3 show the construction of the torch-holder 21. The other torch-holders 22—24 are of similar construction. A bracket 34 fits over the bar 11 and can be clamped in any set location along the bar by a clamping screw 35. A lock nut 36 is provided for holding the clamping screw tight. When the clamping screw 35 is released, the bracket 34 can be moved freely along the bar 11.

The front side of the bracket 34 is recessed to receive a slide 38 (Fig. 2). Plates 39 fastened to the bracket 34 by screws 40 overlap the edges of the recess and form with the recess a vertical guideway for the slide 38.

The lower end of the slide 38 is a split clamp 42 in which is a substantially circular opening for receiving a stud 43 of a swivel bracket 44. The split clamp 42 has a screw 45 which is used to draw the clamp against the stud 43 and hold the stud against turning. A pointer 46 on the swivel bracket 44 moves along a graduated shoulder 47 and indicates the inclination of the swivel bracket about the axis of the stud 43. The swivel bracket 44 can be moved into different angular positions for inclining the torch for bevel cutting.

A torch clamp 49 is connected with the swivel bracket 44 by pivots 50 that thread through opposite arms of a yoke of the swivel bracket and extend into bosses 51 of the torch clamp 49. The axes of the pivots 50 are in the same plane as the axis of the stud 43. A pointer 53 (Fig. 3) on the torch clamp 49 registers with a mark 54 on the swivel bracket 44 when the torch 27 is normal to the plane of the axes of the stud 43 and pivots 50.

A yoke 55 at the top of the torch clamp 49 is pivotally connected with a link 56, and a bifurcated end of the link 56 is connected with a short link 58 by a bolt 59 that has a wing nut 60 which can be tightened to clamp the bifurcated ends of the link 56 against the short link 58 and prevent relative movement of the links 56 and 58. The short link 58 is joined to the swivel bracket 44 by a pivot 61, but when the nut 60 is tightened to clamp the links 56 and 58 against movement, the torch clamp 49 and the swivel bracket 44 form a rigid unit, just as if the links 56 and 58 were replaced with a single link. By changing the angular relation of the links 56 and 58, however, the torch clamp 49 can be held in sloping positions for bevel cutting, if desired.

The torch clamp 49 is a split clamp and has screws 63 at both its upper and lower ends for squeezing the clamp against the torch 27. This clamp 49 is not ordinarily used to grip the torch tightly, but merely to grip it with sufficient friction so that the torch will not slide in the clamp unless some force is applied to the torch to make it move.

The torch 27 has a rack 65 along one side, and this rack slides in a keyway 66 in the torch clamp 49 and prevents the torch from turning in the clamp. A pinion 67 is secured to a shaft 68 that turns in bearings in the torch clamp. The shaft 68 is rotated by a knob 69. The pinion meshes with the rack 65 so that the torch can be raised and lowered by turning the knob 69.

The slide 38 has a rack 70 on its back face, and there is a pinion 71 in the bracket 34 that meshes with the rack 70. The pinion 71 is a sliding fit on the rod 30, but it cannot rotate on the rod because a key 72 secured to the pinion extends into a keyway 73 in the rod. The key 72 fits loosely in the keyway and does not interfere with relative movement of the pinion 71 and rod 30 lengthwise of the rod. Other expedients can be used to cause the rod and pinion to rotate together while leaving them free for relative movement lengthwise of the rod. The construction shown is in its broadest aspects a rod of non-circular cross-section passing through an opening of non-circular section in the pinion.

The pinion 71 is held against endwise movement with respect to the bracket 34 by a shoulder of the bracket at the left-hand side of the pinion (Fig. 2) and a bushing 75 at the right-hand end of the hub of the pinion. The pinion hub is considerably longer than the teeth of the pinion so that the key 72 can be long enough to slide in the keyway 73 without cocking and binding. The bushing 75 is held in the bracket 34 by a set-screw 76.

Figs. 2 and 5 show the construction of the adjusting device 31. A bracket 78 fits on the bar 11 and is clamped at a chosen location on the bar by a clamping screw 79. The rod 30 extends into the bracket 78, and there is a worm wheel 80 keyed on the rod 30 by a key 81 which is preferably a sliding fit in the keyway 73.

A worm 83, best shown in Fig. 5, is secured to a vertically extending shaft 84 that turns in bearings in the bracket and extends upward above the top of the bracket. A hand-wheel 85 is fastened to the upwardly extending end of the shaft 84. Rotation of the hand-wheel 85 turns the worm 83 and through it the worm wheel 80, the rod 30, and the pinion 71 (Fig. 2) in the torch-holder 21. The rod 30 turns similar pinions in all of the brackets 21—24 and causes the slide 38 and the corresponding slides of the other torch-holders to move up or down, depending upon the direction of rotation of the rod, to adjust all of the torches simultaneously.

The worm 83 has a slow pitch so that the worm gearing of the adjusting device 31 is irreversible, and therefore serves to hold the torches in any set position above the work by preventing the weight of the torches and the movable structure associated with them from rotating the rod 30.

Before the torches can be effectively moved toward and from the work as a unit by turning the hand-wheel 85 of the adjusting device 31, it is necessary that each of the torches be adjusted individually to cause it to be at the same distance from the work as the other torches for any given angular position of the rod 30 and its operating mechanism. The knob 68, the rack 66, and pinion 67 provide mechanism for the individual adjustment of the torch in the holder 21, and similar structure of the other torch-holders permits their torches to be adjusted with respect to each other.

There is a flange 87 attached to each end of the rod 30 by a screw. These flanges prevent the rod 30 from being displaced lengthwise far enough to move it out of any of the brackets through which it passes. If the torch-holder 21 is located closer to the adjusting device 31 than shown in Fig. 1, then the rod 30 will project at one or both ends from the brackets and will have end play, but this does not in any way interfere with the operation of the invention. If it is desirable to spread the torch-holders 21—24 and the adjusting device 31 along the bar 11 for a distance greater than the length of the rod 30, then a longer rod is substituted for the rod 30.

The preferred embodiment of the invention has been described but changes and modifications can be made, and some features of the invention can be used without others. It will be understood that the relative movement of the torches with respect to the work in a plane parallel to the work can be obtained by moving the work instead of the torches. Terms of orientation in the description and claims are relative.

I claim:

1. In a universal cutting machine, a supporting frame which is moved in any and changing directions in a plane, a plurality of torch-holders located along the supporting frame, adjusting means associated with each torch-holder for raising or lowering a torch in the holder with respect to said frame, motion-transmitting connections carried by the supporting frame and extending between the adjusting means of the respective torch-holders and adapted to cause common movement of all of the adjusting means, and an adjusting device for operating said motion-transmitting connections.

2. In a machine for making a number of similar and simultaneous cuts by means of a plurality of separate torches carried by a frame that is supported for universal movement in a plane along a predetermined course during a cutting operation, the improvement of a single adjusting device located on the movable frame, and connecting means extending from said device to each of the torches to effect equal and simultaneous adjustment of the respective torches in response to movement of said adjusting device.

3. A universal cutting machine including a plurality of separate torch-holders, supporting means that cause all of the torch-holders to move along similar paths in any and changing directions in a plane, adjustment means associated with each torch-holder for moving a torch in the holder with respect to said supporting means and toward and from the work, and a common operating device connected with the adjustment means of all of the torch-holders.

4. In a universal cutting machine of the class wherein a plurality of torch-holders are located at spaced regions along the front bar of a folding parallelogram supporting frame, and each of the torch-holders includes means for raising and lowering a torch in the holder with respect to the front bar to change the spacing of the torch from the work, the combination with said torch-holders of a rod extending lengthwise of said front bar and operatably connected with the torch raising and lowering means of each torch-holder, and manually actuated means by which the bar is rotated in one direction to cause all of the torches to rise simultaneously and in the other direction to cause simultaneous lowering of all of the torches.

5. A multiple-torch cutting machine including a supporting frame supported for universal movement in a plane, torch-holders located at spaced regions on the supporting frame, a pinion in each torch-holder cooperating with a rack that connects with the torch to raise and lower said torch with respect to the supporting frame, a rod extending between all of said torch-holders and operatably connected with the pinions in all of the torch-holders, so that rotation of the rod rotates all of the pinions through equal angles, and apparatus on the universally movable supporting frame for rotating the shaft and for holding the shaft against rotation when in set position.

6. A multiple-torch cutting machine including a supporting frame, torch-holders located at spaced regions on the supporting frame, a pinion in each torch-holder cooperating with a rack that connects with the torch to raise and lower said torch with respect to the supporting frame, a rod extending through the pinions of the respective torch-holders, and means for rotating the rod to turn the pinions simultaneously and through equal angles, said means including a worm-wheel on the rod, and a worm by which the worm-wheel is rotated, the pitch of said worm being slow enough to make the gearing non-reversible so that the rod is held by the worm in any set position.

7. In a cutting machine having a frame and a torch-holder movable into different locations along the frame, adjusting means on the torch-holder for raising and lowering a torch carried by the holder, an adjustment control device fixed on the frame of the cutting machine, and a connection between the adjustment means on the torch-holder and said control device for transmitting motion of the control device to the adjusting means, said adjustment means on the torch-holder being slidable along said connection so that the location of said connection with respect to the frame remains the same when the torch-holder is in different locations along the frame.

8. A universal cutting machine comprising a supporting bar, a torch-holder movable along the bar and having means for holding it in any set location on the bar, a pinion in the torch-holder in position to cooperate with a rack that is connected with a torch carried by the holder to raise and lower the torch, a wheel supported by the bar, and a connection between said wheel and pinion including a shaft extending lengthwise of the bar and freely fitting through a non-circular opening in the pinion and operably connected with the wheel.

9. A universal cutting machine comprising a supporting bar, a torch-holder movable along the bar and having means for holding it in any set location on the bar, a pinion in the torch-holder in position to cooperate with a rack that is connected with a torch carried by the holder to raise and lower the torch, a rod extending lengthwise of the bar and through the pinion, said rod being slidable lengthwise in the pinion but having a non-circular cross-section so that rotation of the rod rotates the pinion, a worm-wheel on the rod at a region remote from the pinion, and actuating means supported at a given location on the bar including a slow-pitch worm meshing with the worm-wheel, and a wheel for turning the worm.

10. In cutting apparatus, a plurality of torch-holders, a supporting frame that causes all of the torch-holders to move at the same time and in the same direction in a plane parallel to a work-piece, said torch-holders being independently movable on the supporting frame to change their spacing with respect to each other, a single adjusting device at a fixed location on the supporting frame, a rod extending from said adjusting device to all of the torch-holders, each of said torch-holders being movable along the rod when moved on the supporting frame, and means on each torch-holder, operated by said rod, to raise and lower a torch carried by the holder.

11. A cutting machine comprising a supporting frame, a plurality of torch-holders on the frame and movable to change their spacing with respect to each other, means on each torch-holder for raising and lowering a torch carried by the holder, a single adjusting device at a fixed location on the cutting machine, and connections from the adjusting device to the torch raising and lowering means of all of the torch-holders, said torch-holders being freely movable with respect to the adjusting device when said connections are in working relation to both the adjusting device and the raising and lowering means of the torch-holders.

12. A torch-holder comprising a supporting portion for connection with a cutting machine, a bracket having a swivel connection with the supporting portion, a torch clamp connected with the swivel bracket by pivots the axes of which extend at right angles to the axis of said swivel connection, and link means between the bracket and torch clamp for holding them against relative movement.

13. In a torch cutting machine with means for supporting a plurality of torches and for moving them along similar paths including a holder for connecting each torch with the supporting means, apparatus on each holder for adjusting a torch in the holder toward and from a work-piece independently of the torches in the other holders, and other apparatus connected with each holder and operable to shift all of the torches as a unit toward and from the work-piece.

JAMES L. ANDERSON.